US011124371B2

(12) United States Patent
Erickson, Jr.

(10) Patent No.: US 11,124,371 B2
(45) Date of Patent: Sep. 21, 2021

(54) APPARATUS FOR EFFICIENTLY LOADING BULK MATERIALS FOR SEALED TRANSPORT AND A METHOD FOR ITS USE

(71) Applicant: Thomas F. Erickson, Jr., Wallingford, PA (US)

(72) Inventor: Thomas F. Erickson, Jr., Wallingford, PA (US)

(*) Notice: Subject to any disclaimer, the term of this patent is extended or adjusted under 35 U.S.C. 154(b) by 73 days.

(21) Appl. No.: 16/236,950

(22) Filed: Dec. 31, 2018

(65) Prior Publication Data
US 2020/0207558 A1 Jul. 2, 2020

(51) Int. Cl.
*B65G 67/20* (2006.01)
*B65F 3/02* (2006.01)
*B65F 1/14* (2006.01)

(52) U.S. Cl.
CPC .......... *B65G 67/20* (2013.01); *B65F 1/1426* (2013.01); *B65F 1/1452* (2013.01); *B65F 3/02* (2013.01)

(58) Field of Classification Search
CPC ........ B65G 67/20; B65G 67/32; B65G 67/30; B65G 67/22; B65F 3/02
USPC ................................................ 414/205, 206
See application file for complete search history.

(56) References Cited

U.S. PATENT DOCUMENTS

| 4,200,330 | A | 4/1980 | Scott |
| 4,543,035 | A | 9/1985 | Lair |
| 6,309,164 | B1 | 10/2001 | Holder et al. |
| 8,240,969 | B2 | 8/2012 | Medel et al. |
| 8,376,089 | B2* | 2/2013 | Stone ................ B66F 9/06 187/232 |
| 9,415,949 | B2 | 8/2016 | Buse |
| 9,567,170 | B2 | 2/2017 | Bolsoy et al. |
| 2003/0123961 | A1 | 7/2003 | Lewis et al. |
| 2012/0318178 | A1 | 12/2012 | Hanks et al. |
| 2015/0291355 | A1 | 10/2015 | Cardoso Cabral et al. |

* cited by examiner

*Primary Examiner* — Saul Rodriguez
*Assistant Examiner* — Willie Berry, Jr.
(74) *Attorney, Agent, or Firm* — Muskin & Farmer, LLC; Shawn R. Farmer; Jonathan H. Muskin

(57) ABSTRACT

A hinged and pronged plate apparatus for loading railway gondola cars with bulk material, such as municipal solid waste transported by trucks, in a cost-effective and spatially-convenient manner. The railway loading system can have multiple tiers, including a top tier, one or more middle tiers, and bottom tier, which provide working platforms and loading platforms for the gondola cars and vehicles containing the waste and workers that operate the system. The hinged and pronged plate can have a fin with perpendicular prongs extending from the fin. The hinged and pronged plate can be configured to cover the spaces between and surrounding the gondola cars and allows for easy and safe loading of bulk materials from trucks into gondola cars.

14 Claims, 11 Drawing Sheets

APPARATUS FOR EFFICIENTLY LOADING BULK MATERIALS FOR SEALED TRANSPORT AND A METHOD FOR ITS USE

FIELD OF THE INVENTION

The present apparatus for loading bulk materials comprises a hinged and pronged plate ("HAPP"), which is a mechanical device that can be used to efficiently load bulk solids onto railway gondola cars, or similar transport vehicles, including those comprising hinged lids for sealing the bulk solids into each railway gondola car or similar vehicle.

BACKGROUND

Bulk materials that must remain sealed during transportation presently move in many ways by railroad. Solid bulk materials that are pelletized, granulated, or powdered move by covered hopper car. Smaller lots of sealed solid bulk materials move in super-sacks by boxcar. Liquids move by tank car or, in smaller lots, in tank container-on-flatcar (tank COFC). Even smaller lots of liquids move in drums by boxcar. Irregularly-sized bulk solid materials that must remain sealed during transit move by COFC using box-shaped containers. However, the transport of very large shipments of irregular bulk solids is not presently cost-effective by rail when moved in super-sacks by boxcar or when moved by COFC where the acreage needed to operate a COFC terminal is not available or economically viable, such as in densely packed urban areas.

In very expensive urban areas there is currently no cost-effective rail technology to originate large-lot shipments of sealed solid bulk materials such as municipal solid waste (MSW). MSW is a by-product of almost all human habitation, so it represents large and regular streams of materials that require transportation to locations for recycling, incineration, organic processing, landfilling, or other remediation. Transportation of bulk material, including MSW, by rail is an instant application of the present disclosure, according to an embodiment.

An emergent technology for the collection and transport of MSW in densely populated areas is the pneumatic tube. In New York City, a prototypical pneumatic MSW system has been in place since 1975 at Roosevelt Island in the East River, and a new pneumatic system is being installed in 2018 for the massive Hudson Yards complex in Manhattan. However, MSW can only be carried for short distances by pneumatic tubes, so pneumatic collection points must be emptied themselves using longer-range transportation, the most efficient, environmentally friendly, and aesthetic being rail transportation.

The only economically viable technologies to move large-scale volumes of MSW by railroad have been specialized containers-on-flatcars and high-sided gondola cars where large spaces are available for free-standing structures to remove and replace car lids and for vast dumping floors where MSW can be pushed and loaded by front-end graders and loaders. However, COFC, as described above, has inadequacies and restrictions, such as the aforementioned large spatial requirements for COFC terminals, including the high profile required at origin terminals if overhead cranes are utilized to load and unload the COFCs, the wide profile required if mobile lifting vehicles ("sideloaders" or "piggy-packers") are utilized to load and unload COFC; the high cost and relative frailty of sideloaders and containers; chronic leakage problems with the containers as they age; and the aerodynamic and tare-weight inferiority of flatcar shipments compared to shipments in other railway car types.

Non-COFC rail technologies are expensive to utilize and therefore economically viable only for the movement of high-value and small-volume irregular bulk solids, that is, highly dangerous or expensive bulk commodities that require sealing during transit, such as hazardous material waste, radioactive materials, and other irregular bulk materials of high intrinsic value. Applications for these rail technologies have been very specialized and limited, whereas MSW is pervasive and high-volume but not high-value.

MSW has negative intrinsic value because of the high cost of recycling, processing, or disposing of its constituents. There are economic advantages to replacing the current COFC technology being utilized with a less expensive and more durable transportation method. Environmentally, improving the ratio of lading weight to total equipment weight and using a more aerodynamic car type would reduce fuel usage compared to COFC technology and thereby reduce emissions per gross ton-mile; but more significantly, making rail transportation cost-competitive with medium-distance garbage trucks would enable the conversion of MSW movements to the inherently less-polluting rail mode. Additionally, utilizing a railway as the transportation method is more aesthetically pleasing and generally less obtrusive than truck movement.

What is needed is a cost-effective railway transportation technology that allows for the safe and secure unloading of bulk material from trucks or pneumatic tubes into modified railway gondola cars, or similar rail transportation vehicles.

SUMMARY OF THE INVENTION

It is an aspect of the present device to provide a railway loading apparatus that creates a cost-effective and spatially convenient method of loading bulk materials into open gondola cars, in a multi-tiered terminal system. This aspect can be achieved by a railway loading system comprising: a fixed wall; a hinged and pronged plate comprising a fin having a first side, a second side, and a third side, in addition to a first end and a second end, wherein the first side and the second side connect at an approximate ninety (90) degree angle and the third side connects to the first side to the second side to form a triangular shape, and the fin is hingedly attached to the fixed wall at or near the approximate ninety (90) degree angle; two or more prongs, each having a first end and second end, wherein the first end of each prong is fixedly attached to the third side of the fin such that the bottom of each prong is in approximately the same plane as the second side of the fin and perpendicular to the first side; and the hinged and pronged plate can be moved between an elevated position and a lowered position by rotating the hinged and pronged plate about the hinged attachment of the fin to the fixed wall at or near the perpendicular angle.

This aspect can also be achieved by a method for using a railway loading system to load bulk materials into a gondola car having a hinged lid, the method comprising: providing a fixed wall; providing a hinged and pronged plate comprising a fin having a first side, a second side, and a third side, in addition to a first end and a second end, wherein the first side and the second side connect at a an approximate ninety (90) degree angle and the third side connects to the first side to the second side to form a triangular shape, and the fin is hingedly connected to the fixed wall at or near the approximate ninety (90) degree angle and the hinged and pronged plate is configured to be moved between an elevated position and a lowered position over the gondola car by rotating the hinged and pronged plate about the hinged connection of the fin to the fixed wall at or near the approximate ninety (90) degree angle, two or more prongs located one each just outside the two ends of the gondola car at a set distance apart from each other, each prong having a first end and second end and an upper side and a lower side, wherein the first end of each prong is fixedly attached to the third side of the fin such that the bottom of each prong is in approximately the same plane as the second side of the fin and perpendicular to the first side; providing a drive cable system comprising at least one upper drive cable connecting the upper side of the second end of at least one prong, and actuated by an upper drive spool capable of raveling and unraveling the upper drive cable, and at least one lower drive cable, connecting the lower side of the second end of at least one prong, and actuated by a lower drive spool capable of raveling and unraveling the lower drive cable; providing a gondola car having a hinged lid configured to move between an up position and a down position; providing at least one coupling cable having a first end connected to the upper side of the second end of at least one prong and a second end capable of connecting to the hinged lid wherein the coupling cable, when connected to the hinged lid is capable of lifting the hinged lid into the up position when the at least one prong is moved into the lowered position, and to lower the hinged lid into the down position when the at least one prong is moved into the elevated position; providing bulk materials to be loaded into the gondola car; moving the hinged and pronged plate into the elevated position by using the upper drive spool to ravel in the upper drive cable, while the lower drive spool unravels the lower drive cable; placing the gondola car having a hinged lid into the set distance between two prongs; connecting the first end of a coupling cable to the upper side of the second end of at least one prong and the second end of the coupling cable to the hinged lid; moving the hinged and pronged plate into the lowered position by using the lower drive spool to ravel in the lower drive cable, while the upper drive spool is allowed to unravel the upper drive cable, thus causing the coupling cable to simultaneously move the hinged lid into the up position; and loading the bulk material into the gondola car.

This aspect can also be achieved by a railway loading system comprising: a fixed wall; a bottom tier to provide a platform for the ingress and egress of the gondola cars; a fin-side middle tier and a lid-side middle tier to provide working platforms for attendants; a top tier to provide a platform for the ingress and egress of trucks carrying the bulk materials to be loaded onto the gondola cars; a hinged and pronged plate comprising a fin having a first side, a second side, and a third side, in addition to a first end and a second end, wherein the first side and the second side connect at an approximate ninety (90) degree angle and the third side connects to the first side to the second side to form a triangular shape, and the fin is hingedly attached to the fixed wall at or near the approximate ninety (90) degree angle; two or more prongs, each having a first end and second end, wherein the first end of each prong is fixedly attached to the third side of the fin such that the bottom of each prong is in approximately the same plane as the second side of the fin and perpendicular to the first side; and the hinged and pronged plate can be moved between an elevated position and a lowered position by rotating the hinged and pronged plate about the hinged attachment of the fin to the fixed wall at or near the perpendicular angle.

BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which.

DETAILED DESCRIPTION

Figure 1:
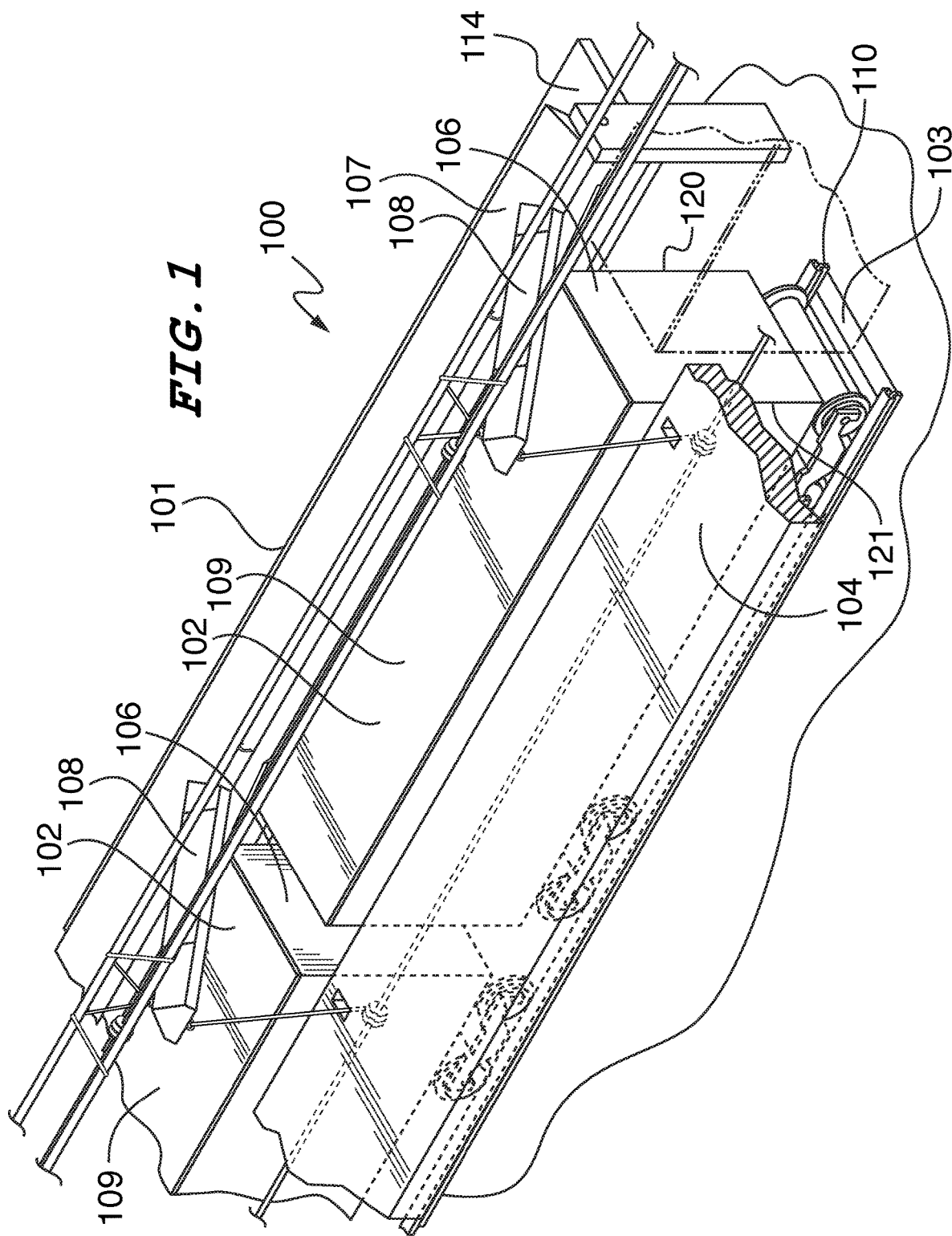
FIG. 1 is a partial top, front and side perspective view of middle and lower tiers of a railway loading system comprising a hinged and pronged plate in an elevated position above gondola cars on a track, according to an embodiment.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The present railway loading system is a mechanical apparatus, which can be used to efficiently load bulk materials into railroad gondola cars, or similar vehicles that can be sealed for transport by a hinged lid or similar sealing device. Specifically, the apparatus can be used to load modified gondola cars consisting of railroad freight cars having partially affixed lids, according to an embodiment. Gondola cars are well-known in the art and typically consist of a four-sided, open top, box-like container on wheels. In an embodiment, gondola cars are modified to add one or more hinges on one side of the four-sided, box-like container, said hinges pivotably connecting a lid to that side of the gondola car wherein the gondola lid can be moved between an open and closed configuration. In an alternative embodiment, a removable four-sided, box-like liner, comprising a hinged lid can be inserted into the gondola car, such that the liner can be loaded with bulk materials and the gondola car can support and transport the liner.

In an embodiment, the gondola cars can be moved onto the bottom tier of a loading system consisting of multiple tiers of internal structure. In an embodiment, a top tier can provide a platform for the ingress and egress of trucks carrying the bulk materials to be loaded onto the gondola cars. A bottom tier can provide a platform for the ingress and egress of the gondola cars beneath a hinged and pronged plate ("HAPP"). One or more middle tiers can provide working platforms for attendants.

In an embodiment of the railway loading system, the HAPP can comprise a fin hingedly connected to a vertical wall or similar structure configured to support the HAPP. The HAPP also can comprise a plurality of prongs protruding perpendicularly from the fin. According to an embodiment, the fin and the prongs can be configured to cover spaces, or gaps that exist between two connected gondola cars and spaces that exist between each gondola car and the vertical wall onto which the fin is connected. Additionally, according to an embodiment, the fin and the perpendicular prongs can be sloped such that any bulk material delivered from the top tier will be directed into the gondola cars while at the same time preventing material from falling into the gaps surrounding each gondola car.

In an embodiment, the HAPP can be rotated about the hinged connection between an elevated position and a lowered position using a cable system, hydraulic cylinders or any other suitable actuating mechanism. In an embodiment, the cable system can hold the prongs in an elevated position allowing sufficient clearance for the ingress and egress of the gondola cars along rails on the bottom tier. The motored cable system is configured to simultaneously lower the HAPP while raising the lids of each gondola car, once the lids are attached to coupling cables. In a lowered and extended position, each prong can rest between two adjacent and connected gondola cars and the fin can cover the gap between the gondola cars and the vertical wall. The side of each gondola car opposite the side connected to the fin can be protected by the raised lid when bulk materials are dumped from the side of the vertical wall. In this way, the present apparatus can allow bulk materials to be deposited from the trucks located on the top tier into the open gondola cars located on the bottom tier with a minimum amount of the bulk materials falling outside the open gondola cars.

Reference will now be made in detail to the present embodiments of the invention, examples of which are illustrated in the accompanying drawings.

FIG. 1 is a partial top, front and side perspective view of middle and lower tiers of a railway loading system 100 comprising a HAPP 101 in an elevated position, according to an embodiment. The HAPP 101 can be implemented in a multi-tiered railway loading system 100, wherein one or more gondola cars 102 can be located on a bottom tier 103 of the railway loading system 100. According to an embodiment, the railway loading system 100 can also comprise a lid-side middle tier platform 104, located near the tops of the gondola cars 102, configured to provide a workspace for railway attendants (not shown in FIG. 1) and a top tier (first shown in FIG. 5) opposite the lid-side middle tier platform 104, said top tier configured to provide a platform for one or more vehicles (not shown in FIG. 1), such as a truck, so that each truck can unload its contents into the one or more gondola cars 102. In an embodiment, a fin-side middle tier platform 114 can be located opposite the lid-side middle tier platform 104 and below the top tier. The fin-side middle tier platform 114 can provide a platform for railway workers to connect and disconnect cables and to remove any solid waste that has collected on the HAPP 101.

According to an embodiment, the HAPP 101 can comprise an elongated triangular structure 107, also referred to as a "fin," configured to extend along the length of the railway loading system 100. The fin 107 can comprise a first side, a second side, and a third side, in addition to two ends, wherein the first side and the second side connect at a roughly perpendicular angle, and the third side connects to the first and second side to complete the triangular shape of the fin 107. According to an embodiment, the fin 107 can be hingedly attached to a fixed wall (not clearly shown in FIG. 1) or similar structure near that roughly perpendicular angle. Furthermore, prongs 108 can be connected at regular intervals along the length of the fin 107, and at right angles to the fin 107.

Open spaces 106 exist between each gondola car, as this is where the couplers (not shown in FIG. 1) connecting the gondola cars 102 to each other or to a locomotive (not shown in FIG. 1) are typically located. Other open spaces (clearly shown in FIGS. 5 thru 8) exist along the sides of the gondola cars 102, including on the side closest to the fin 107 of the HAPP 101. According to an embodiment, the bulk materials (not shown in FIG. 1) can be loaded from the fin-side 120 of the railway loading system 100. The fin-side 120 can be the side where the fin 107 is located, and which is opposite the lid-side 121, which is the side where the lid 109 (shown in a closed position in FIG. 1) of each gondola car 102 can be hingedly attached to each car 102. When the lid 109 is lifted into an open position, it effectively blocks any bulk material from accessing the open space located along the lid-side 121 of the gondola car 102 opposite the side where the fin 107 is located. According to an embodiment, the HAPP 101, comprising the fin 107 and prongs 108, can be designed to cover the remaining open spaces surrounding the gondola cars, allowing for the safe deposit of a maximum amount of bulk material into the gondola cars 102, while minimizing the amount of bulk material falling outside each gondola car 102. In an embodiment, the HAPP 101 can be located at a height above the tops of the gondola cars 102 which are located on a track 110 on the bottom tier 103 of the railway loading system 100.

Figure 2:
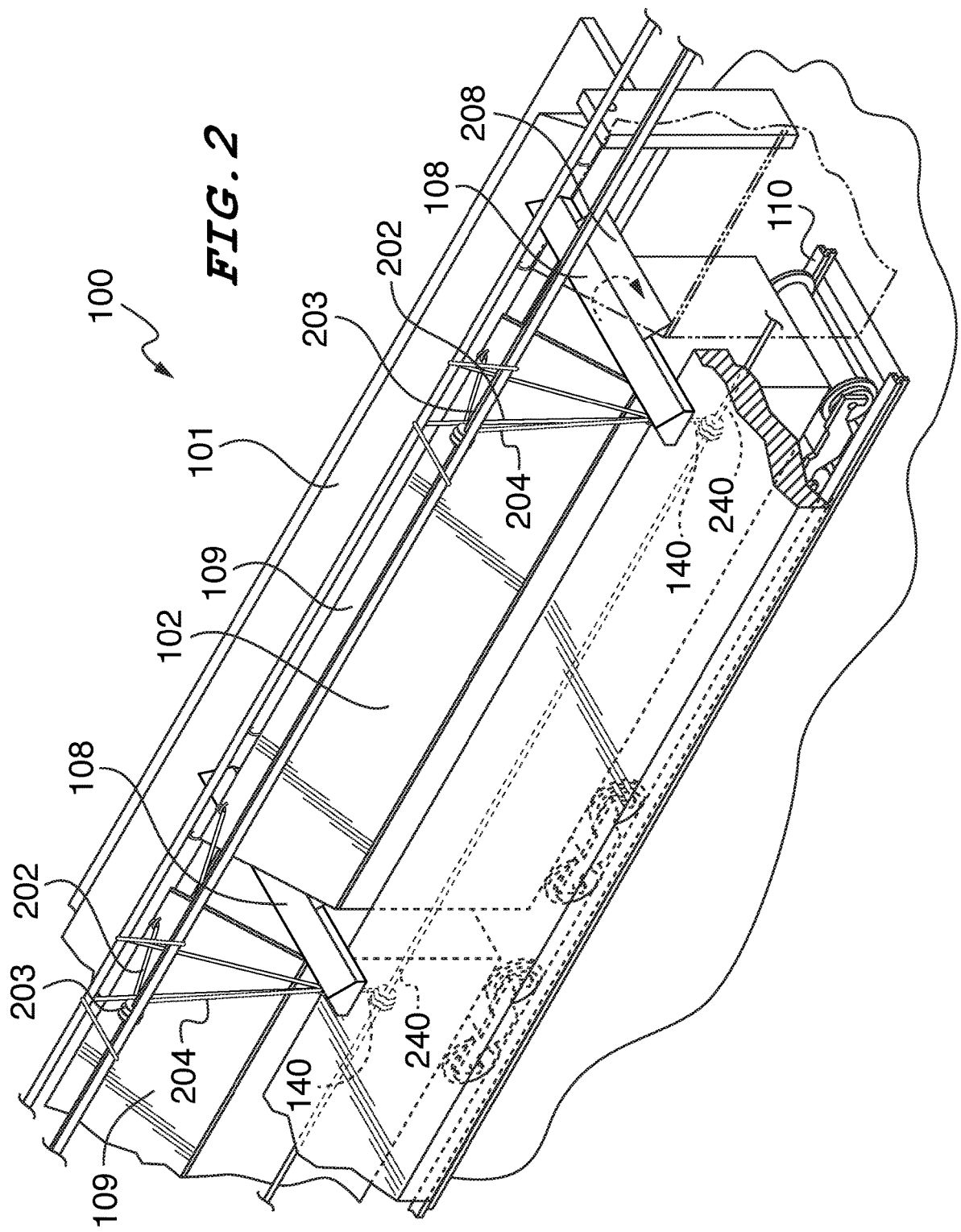
FIG. 2 is a partial top, front and side perspective view of middle and lower tiers of a railway loading system comprising a hinged and pronged plate in a lowered position above gondola cars on a track, according to an embodiment.

FIG. 2 is a partial top, front and side perspective view of middle and lower tiers of a railway loading system 100 comprising a HAPP 101 in a lowered position above one or more gondola cars 102 located on a track 110, according to an embodiment. The railway loading system 100 can comprise a cable system in which movement of upper drive cables 204 can be achieved by one or more motor-powered upper drive spools 203 and movement of lower drive cables 140 (also visible in FIG. 1) can be achieved by movement of one or more lower drive spools 240. The cable system also comprises one or more coupling cables 202 which connect each prong 108 of the HAPP 101 to the respective lid 109 of each gondola car 102. According to an embodiment, the cable system can simultaneously rotate the HAPP 101 between an elevated position (as shown in FIG. 1) and a lowered position (as shown in FIG. 2) and move each lid 109 between a closed position (as shown in FIG. 1) and an open position (as shown in FIG. 2). In another embodiment, the coupling cable 202 can be attached to the HAPP 101 and the lids 109 using detachable coupling mechanisms other than hooks and handles as shown in the figures. In alternative embodiments, actuation of both the HAPP 101 and the lids 109 can be performed manually or by using powered mechanisms other than drive spools and cables as shown in the figures. In this view, a prong wing 208 is shown in a deployed position indicating how it could allow each prong 108 to more effectively direct bulk material (not shown in FIG. 2) into a gondola car 102.

Figure 3:
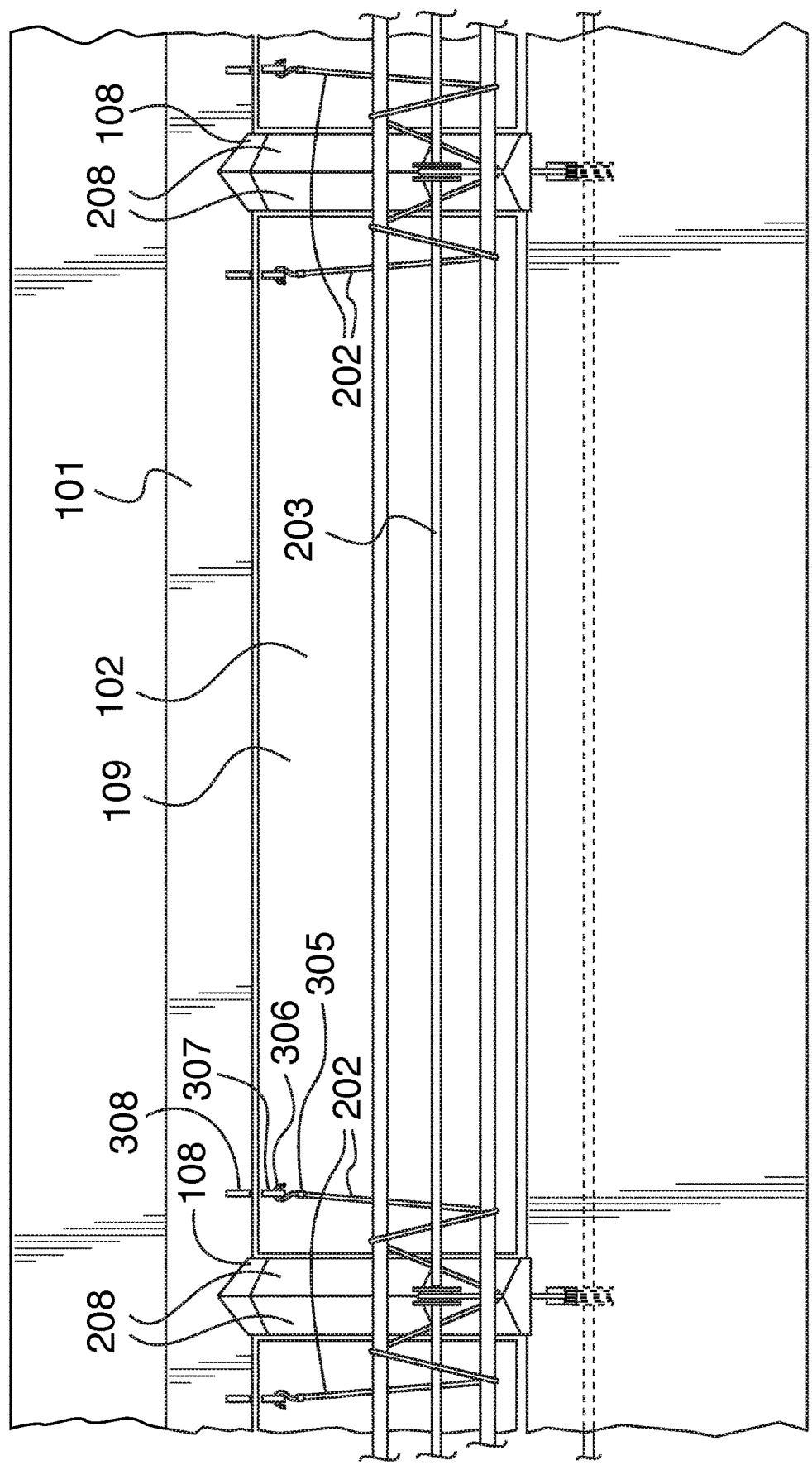
FIG. 3 is a partial top-down view of middle and lower tiers of a railway loading system comprising a hinged and pronged plate in an elevated position above gondola cars, wherein the prong wings have not been deployed, according to an embodiment.

FIG. 3 is a partial top-down view of middle and lower tiers of a railway loading system 100 comprising a HAPP 101 in an elevated position above one or more gondola cars 102, wherein the prong wings 208, connected to the prongs 108, have not been deployed and the one or more lids 109 of each gondola car 102 have not yet been raised, according to an embodiment. In an embodiment, a first end 305 of the coupling cable 202 can comprise a hook 306 which can be connected to a lid handle 307 situated on the edge of each lid 109 located on the fin-side 120 (as shown in FIG. 1), to raise each lid 109 to prepare for loading bulk materials (not shown in FIG. 3). The hook 306 can be removed and attached to an additional fin handle 308 situated on the fin 107, to keep it secured during the egress and ingress of the gondola cars 102. The motor-powered upper drive spool 203 is more clearly visible in FIG. 3 than in FIG. 2.

Figure 4:
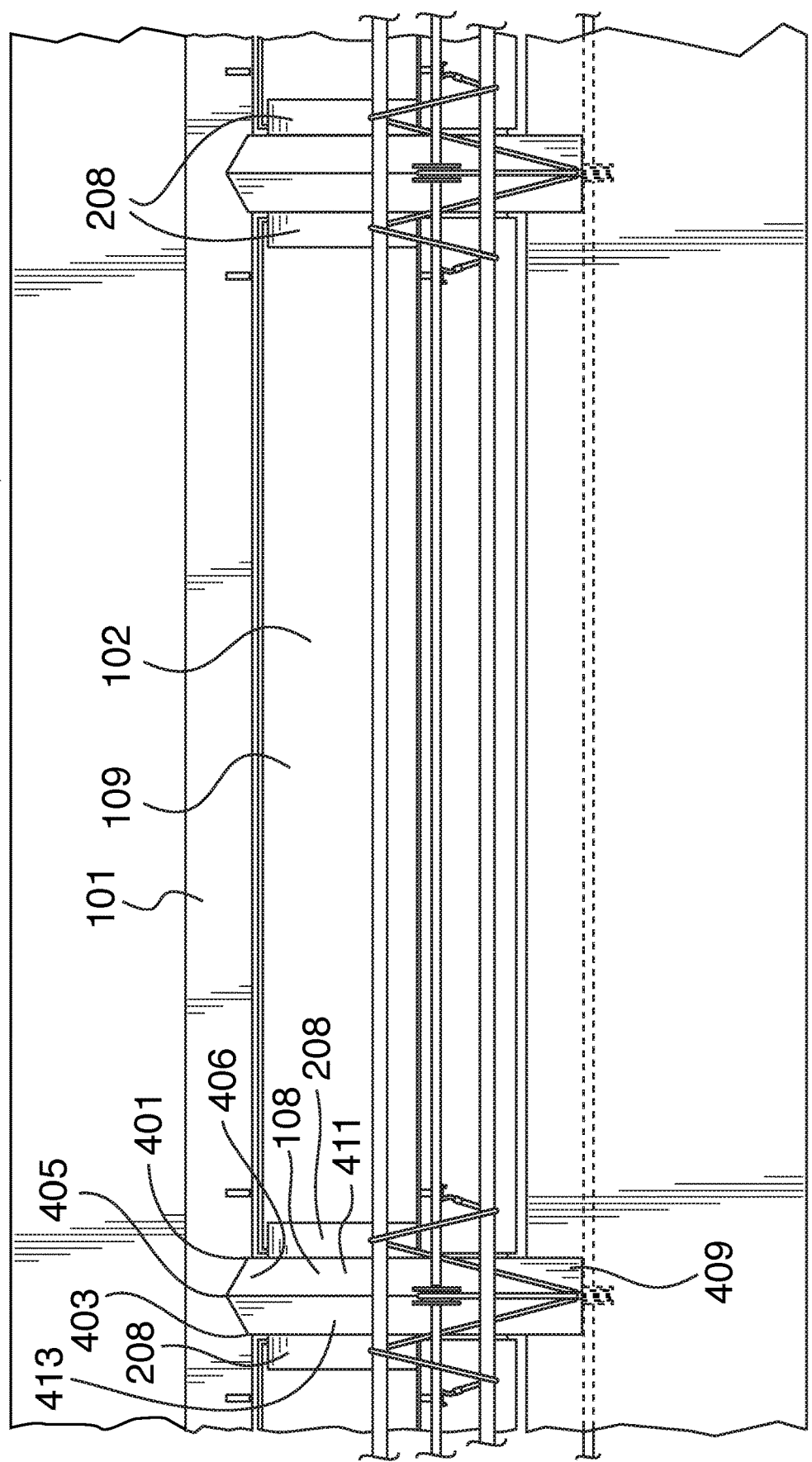
FIG. 4 is a partial top-down view of middle and lower tiers of a railway loading system comprising a hinged and pronged plate in a lowered position above gondola cars, wherein the prong wings have been deployed, according to an embodiment.

FIG. 4 is a partial top-down view of the middle and lower tiers of a railway loading system 100 comprising a HAPP 101 in a lowered position above gondola cars 102, wherein the prong wings 208 have been deployed and the gondola lid 109 has been raised, according to an embodiment. In this figure, each prong 108 can be seen resting over the spaces 106 (shown in FIG. 1) between the gondola cars 102. Each prong 108 can comprise a front edge 401 and rear edge 403 and a midline 405 located between and above the front edge 401 and rear edge 403, wherein the front edge 401, rear edge 403 and midline 405 are all parallel to each other and all connect a first end 406 of each prong 108 to a second end 409 of each prong 108. A first sloped surface 411 of the prong 108 can connect the midline 405 to the front edge 401 and a second sloped surface 413 can connect the midline 405 to the rear edge 403, and wherein a higher side of the first sloped surface can be located along the midline 405 and a lower side of the first sloped surface 411 can be located along the front edge 401, and wherein a higher side of the second sloped surface 413 can be located along the midline 405 and a lower side of the second sloped surface 413 can be located along the rear edge 403. Bulk material striking either the first sloped surface 411 or the second slope surface 413 is therefore directed away from the midline 405 and toward either the front edge 401 or the rear edge 403, which in turn then directs the bulk material toward the respective prong wings 208 pivotably connected to either the front edge 401 or the rear edge 403. For example, a piece of bulk material striking on the side of the midline 405 nearest the front edge 401, is likely to roll or slide down the first sloped surface 411 toward the prong wing 208 pivotably connected to the front edge 401, then proceed down the prong wing 208 and into the gondola car 102.

Figure 5:
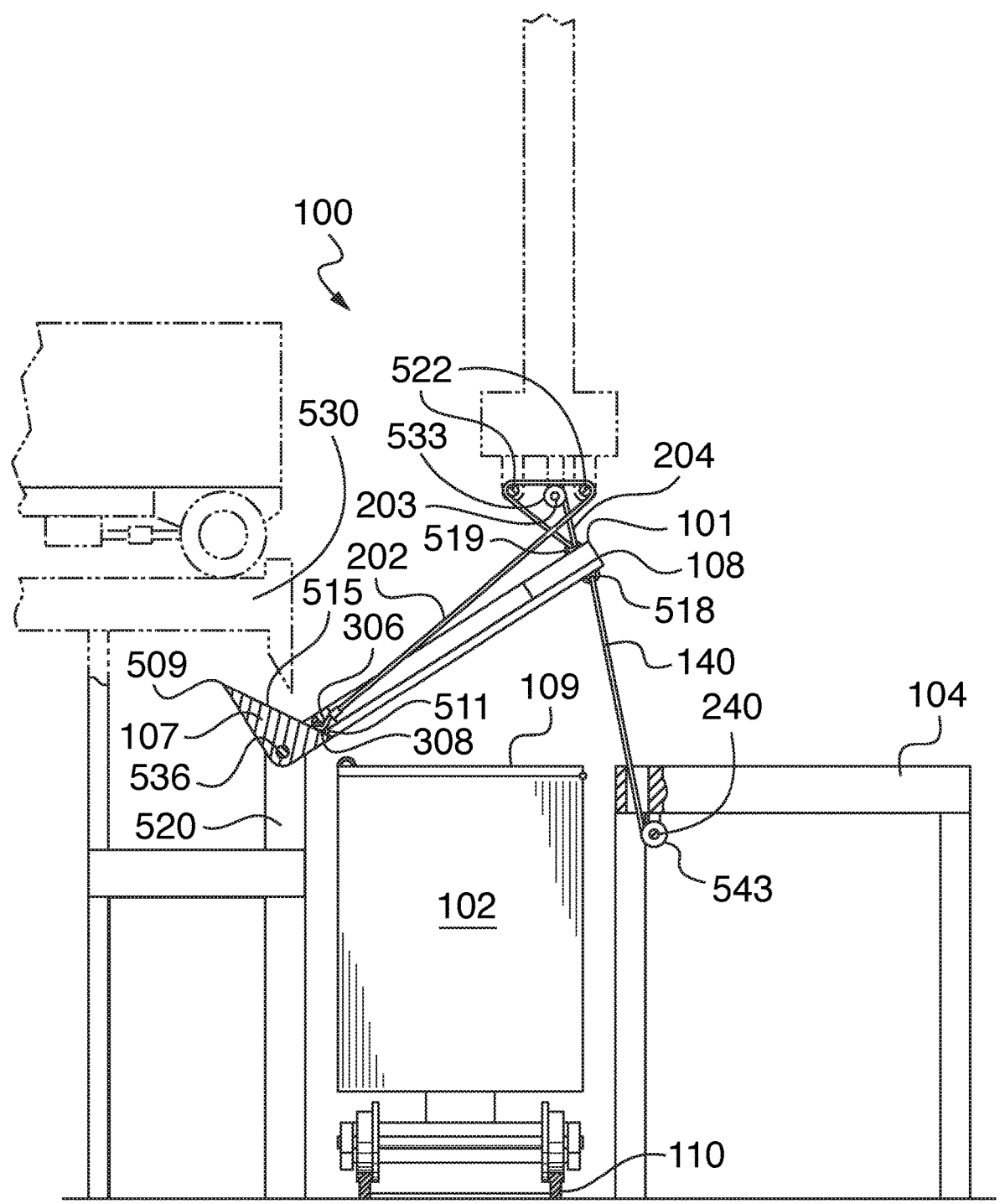
FIG. 5 is a side view of all tiers of a railway loading system comprising a hinged and pronged plate in an elevated position above a gondola car, wherein the gondola lid is closed, according to an embodiment.

FIG. 5 is a side view of a railway loading system 100 comprising a HAPP 101 in an elevated position above a gondola car 102, wherein the gondola lid 109 is closed, according to an embodiment. In an embodiment, the fin 107 (shown in cross-section) of the HAPP 101 can comprise a sloping top surface 515 connecting a top edge 509 of the fin 107 to a bottom edge 511 of the fin 107, wherein a higher side of the sloping top surface 515 is located along the top edge 509 of the fin 107 and a lower side of the sloping top surface 515 is located along the bottom edge 511 of the fin 107. The sloping top surface 515 of the fin 107 is configured to direct material into each gondola car 102 when the HAPP 101 is in a lowered position. When the fin 107 and prongs 108 of the HAPP 101 are in the elevated position as shown in FIG. 5, there is a gap between the sloping top surface 515 of the fin 107 and a fixed wall 520 extending from a top tier 530, and there is clearance below the prongs 108 sufficient to clear the movement of cars 102 and their locomotive units on the track 110. FIG. 5 shows where the first side of the fin 107 can be hingedly connected 536 to a fixed wall 520.

Also shown in FIG. 5 is an embodiment of a cable system used to actuate both the HAPP 101 and the lid 109 of each gondola car 102. According to an embodiment, one or more coupling cables 202 can be configured to attach the prongs 108 to the lids 109 by extending between them over and around one or more parallel cable rollers 522. One or more of the cable rollers 522 can be configured to extend throughout the railway loading system 100 at a height above that of a top tier 530 of the railway loading system 100. An upper drive spool 203 can be mounted near the one or more cable rollers 522 near the top tier 530 and run the length of the HAPP 101 according to an embodiment. The upper drive spool 203 can comprise upper drive spool reels 533, which can be similar to a pulley in structure and can provide a point of connection to the upper drive cable 204, as well as a structure upon which the upper drive cable 204 can be raveled and unraveled. At least one upper drive cable 204 can connect the upper drive spool 203 to at least one prong 108, according to an embodiment. In this figure, a hook 306 on the end of the coupling cable 202 is connected to a fin handle 308 situated on the fin 107. The lower drive cable 140 can be attached to the lower drive spool 240 located beneath the lid-side middle tier platform 104 of the railway loading system 100. According to an embodiment, the lower drive spool 240 can comprise lower drive spool reels 543, similar in function and structure to the upper drive spool reels 533, described above, which can facilitate the raveling and unraveling of the lower drive cable 140 around the lower drive spool 240.

According to an embodiment, the coupling, cable 202 can merely be a mechanical linkage between a lid 109 and a prong 108 of the HAPP 101, effecting their movement in unison. The prongs 108 themselves are lowered by the powered rotation of the lower drive spool 240, which ravels in the lower drive cable 140 leading to the lower prong handle 518 located on the lower side of the prong 108. The prongs are raised by the powered rotation of the upper drive spool 203; which can ravel in the upper drive cable 204 connected to the upper prong handle 519, located on the upper side of the prong 108 opposite the lower prong handle 518. Note that for lowering the HAPP with the powered rotation of the lower drive spool 240, its counterpart, the upper drive spool 203 is in neutral so as to allow the unraveling of the upper drive cable 204, and vice versa for raising the HAPP 101. In an embodiment, both the upper drive spool 203 and the lower drive spool 240 can be rotated by electric motors.

Figure 6:
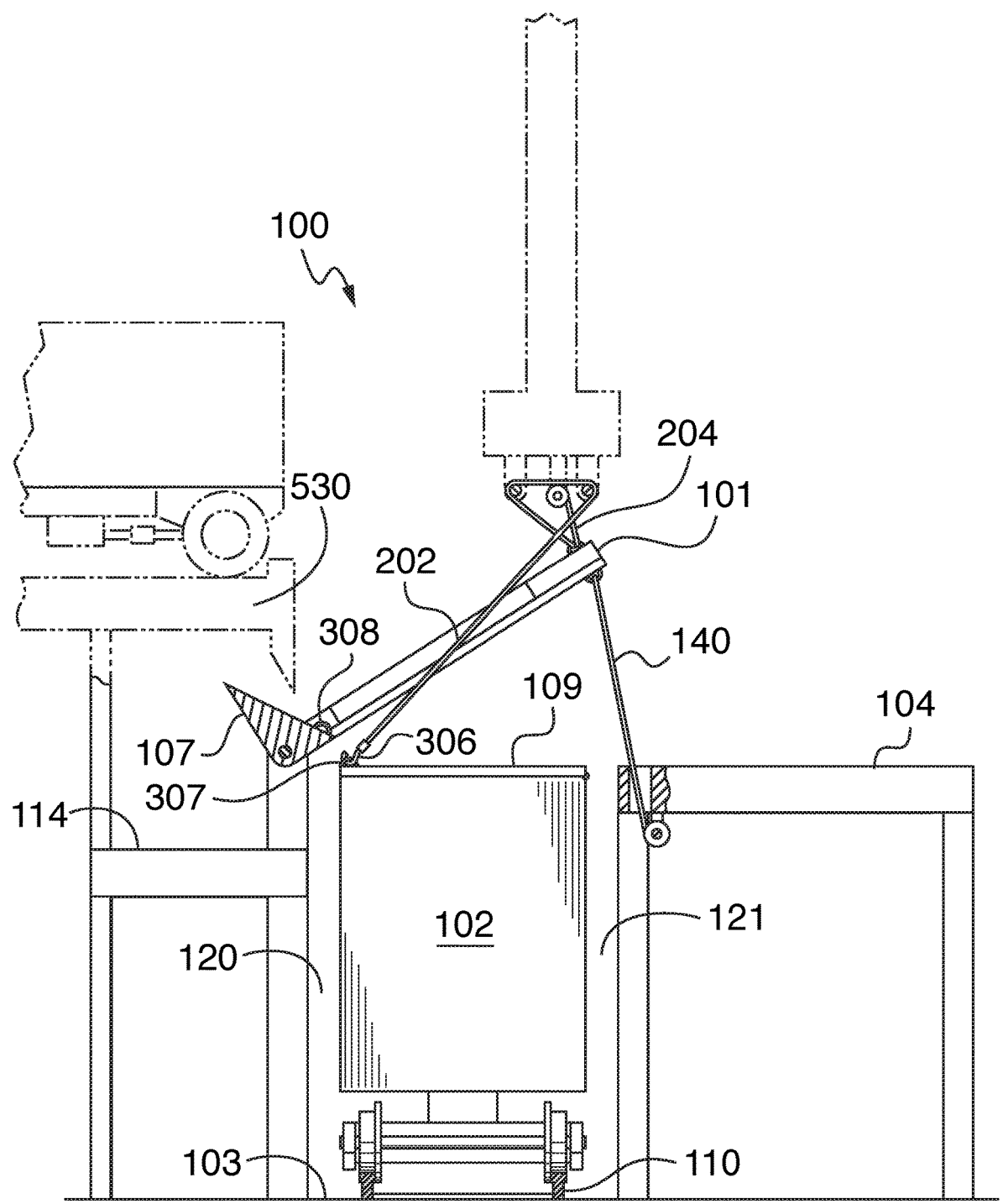
FIG. 6 is a partial side view of all tiers of a railway loading system comprising a hinged and pronged plate in an elevated position above a gondola car, wherein the lid is closed and connected to a coupling cable, according to an embodiment.

FIG. 6 is a side view of the railway loading system 100 comprising a HAPP 101 shown in FIG. 5 wherein the gondola lid 109 remains closed but is now connected to a coupling cable 202, according to an embodiment. In this figure, the hook 306 is no longer connected to fin handle 308 on the fin 107 but is instead connected to a lid handle 307, which can allow the lid 109 to be lifted when the upper drive cable 204 is unraveled and the lower drive cable 140 is raveled according to an embodiment.

Also clearly shown in FIG. 6 are the different tiers comprising the railway loading system 100. Specifically, the view shows the bottom tier 103, where the track 110 can be located. Also shown, the lid-side middle tier platform 104, from which attendants can access the HAPP 101 and the cable system from the lid-side 121, and the fin-side middle-tier platform 114, from which attendants can access the HAPP 101 and the cable system from the fin-side 120. Lastly, the top tier 530 is shown, which can be a platform for material to be delivered for loading each gondola car 102.

Figure 7:
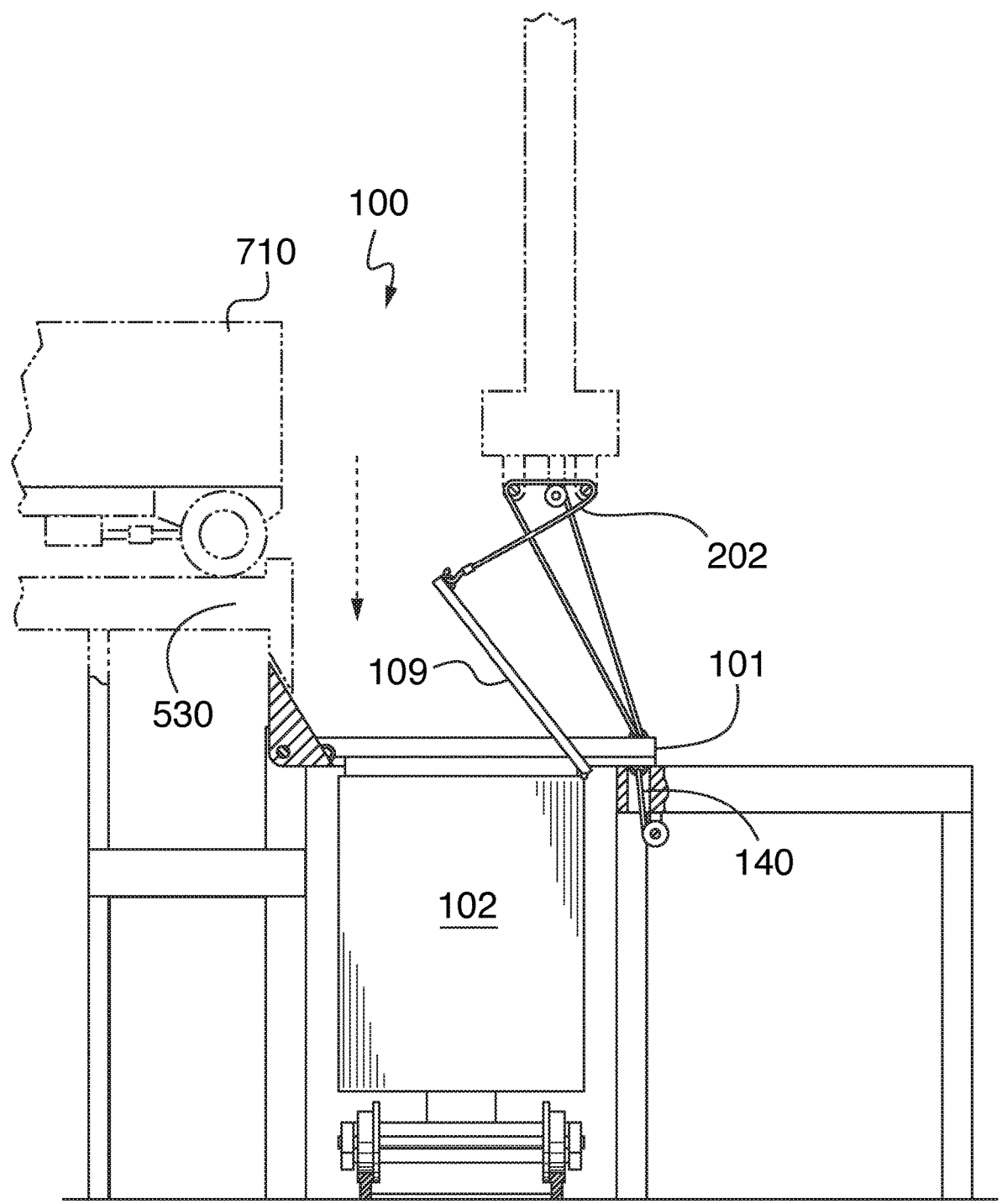
FIG. 7 is a side view of all tiers of railway loading system comprising a hinged and pronged plate in a lowered position above a gondola car, wherein the lid has been opened by the joint action of a drive cable on the hinged and pronged plate and a coupling cable on the lid, according to an embodiment.

FIG. 7 is a side view of the railway loading system 100 comprising the HAPP 101, shown in FIG. 5, in a lowered position caused by the raveling of the lower drive cable 140, above a gondola car 102, wherein the gondola lid 109 has been moved simultaneously into an opened position by the coupling cable 202, according to an embodiment. In this position, the gondola car 102 is ready to be filed with the bulk materials (not shown in FIG. 7), which can be unloaded from a vehicle 710 located on the top tier 530, according to an embodiment. In an alternative embodiment, the bulk materials can be distributed by one or more pneumatic tubes (not shown) into each gondola car 102.

Figure 8:
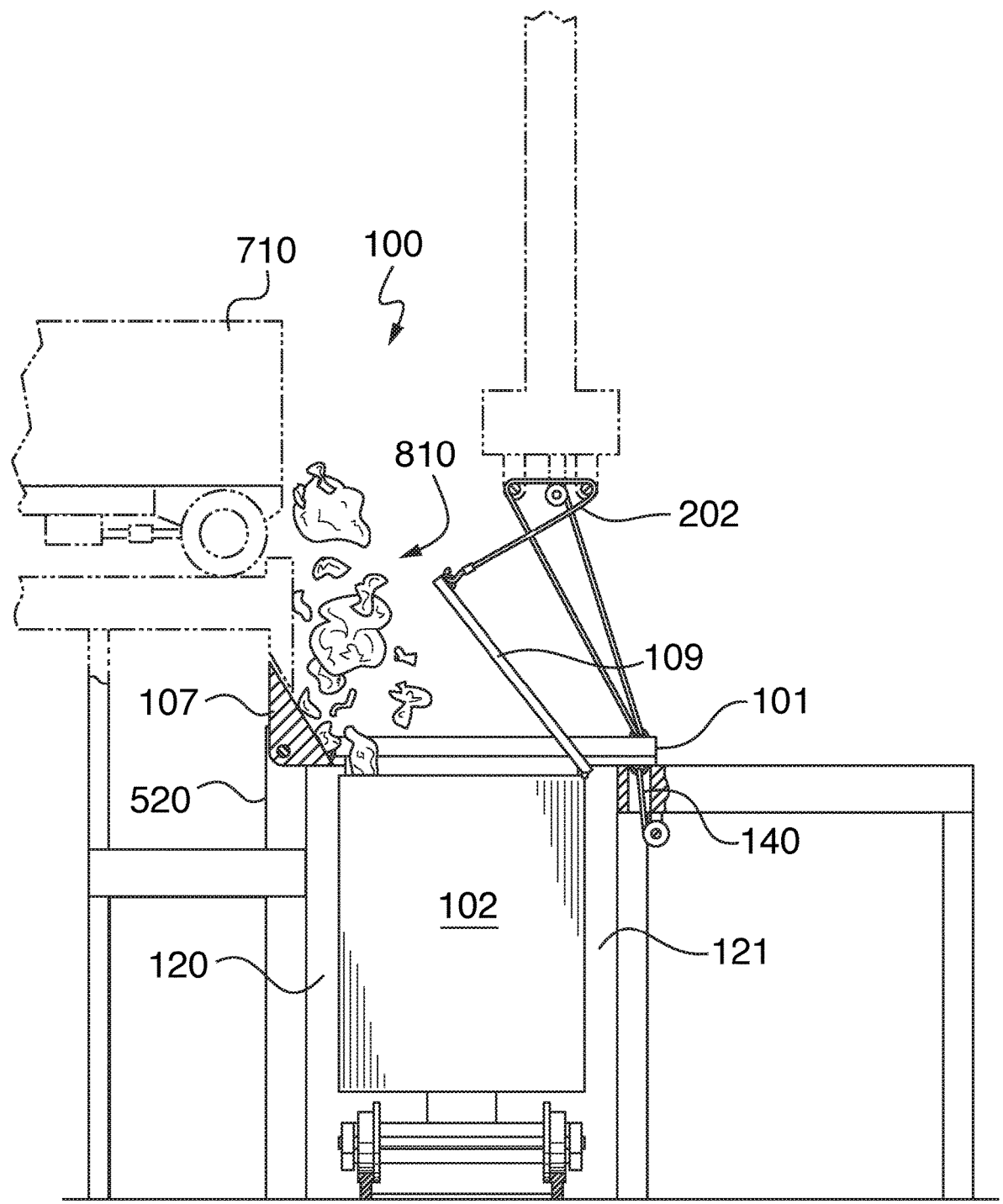
FIG. 8 is a side view of all tiers of a railway loading system comprising a hinged and pronged plate in a lowered position above a gondola car, wherein the lid has been opened and waste (sometimes referred to as "municipal solid waste" or "MSW") is being unloaded from the back of a truck and loaded into the gondola car according to an embodiment.

FIG. 8 is a side view of a railway loading system 100 comprising the HAPP 101 shown in FIG. 5, in a lowered position above a gondola car 102, wherein the gondola lid 109 has been opened by one or more lower drive cables 140 in conjunction with at least one coupling cable 202. Bulk materials 810 are being unloaded from the back of the vehicle 710 into the gondola car 102, according to an embodiment. This view clearly depicts how the bulk materials 810 can be directed by the fin 107 into the gondola car 102 and thus preventing bulk materials 810 from falling into the space along the fin-side 120 of the railway loading system 100 between the gondola car 102 and the fixed wall 520. Likewise, this view clearly depicts how the bulk materials 810 can be prevented from falling into the space along the lid-side 121 of the gondola car 102 by the by the gondola lid 109.

Figure 9:
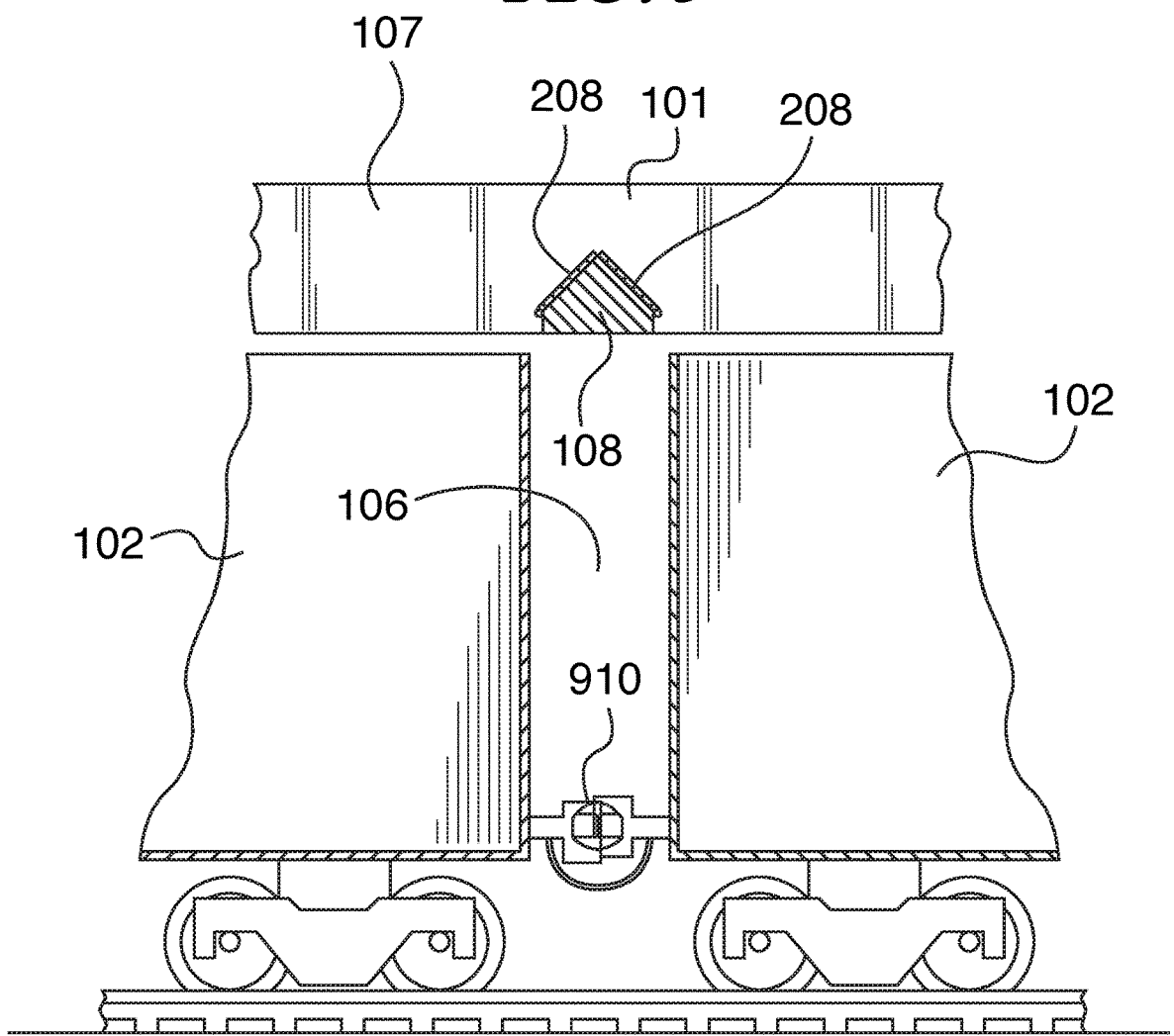
FIG. 9 is a partial front cut-away view of a hinged and pronged plate in a lowered position above the ends of two connected gondola cars wherein the prong wings have not been deployed, according to an embodiment.

FIG. 9 is a front cut-away view of a HAPP 101 in a lowered position, above the ends of two connected gondola cars 102, showing a cross-section of a prong 108, wherein prong wings 208 are pivotably connected to the prong 108, and are not deployed, according to an embodiment. This view shows the position of the prong 108 between two gondola cars 102. This view also shows the position of the prong 108 in relation to the fin 107 portion of the HAPP 101. This view also clearly depicts an open space 106 between two gondola cars 102, wherein the open space 106 is created by at least one set of couplers 910 connecting the gondola cars 102 to each other.

Figure 10:
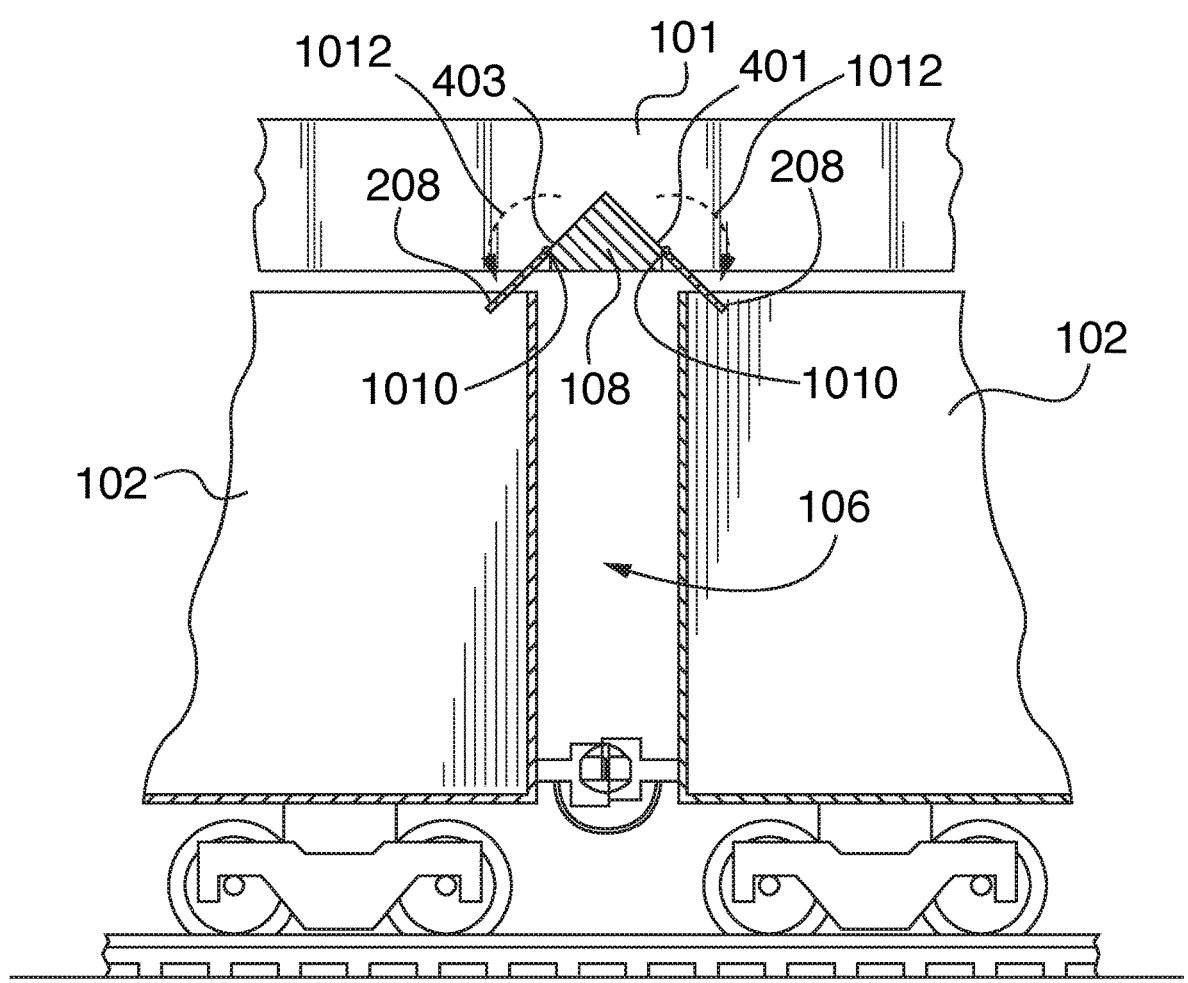
FIG. 10 is a partial front cut-away view of a hinged and pronged plate in a lowered position above the ends of two connected gondola cars wherein the prong wings have been deployed, according to an embodiment.

FIG. 10 is a front cut-away view of a HAPP 101, as previously shown in FIG. 9 in a lowered position, above the ends of two connected gondola cars 102, showing a cross-section of a prong 108, wherein the prong wings 208 have been deployed, according to an embodiment. In this embodiment, the prong wings 208 are each pivotably attached to either the front edge 401 or the rear edge 403 of the prong 108 by hinges 1010 or similar connecting devices and the arrows 1012 show the path of their movement from an undeployed position to a deployed position. In this deployed position, the prong wings 208 can direct bulk materials (not shown in FIG. 10) falling onto the prong 108 into the gondola cars 102 and prevent such bulk materials from accessing the open space 106 located between the gondola cars 102. According to an embodiment, one or more prongs, or one or more prong wings can be coated in a smooth or slippery material, such as Teflon, configured to deflect material from each surface.

Figure 11:
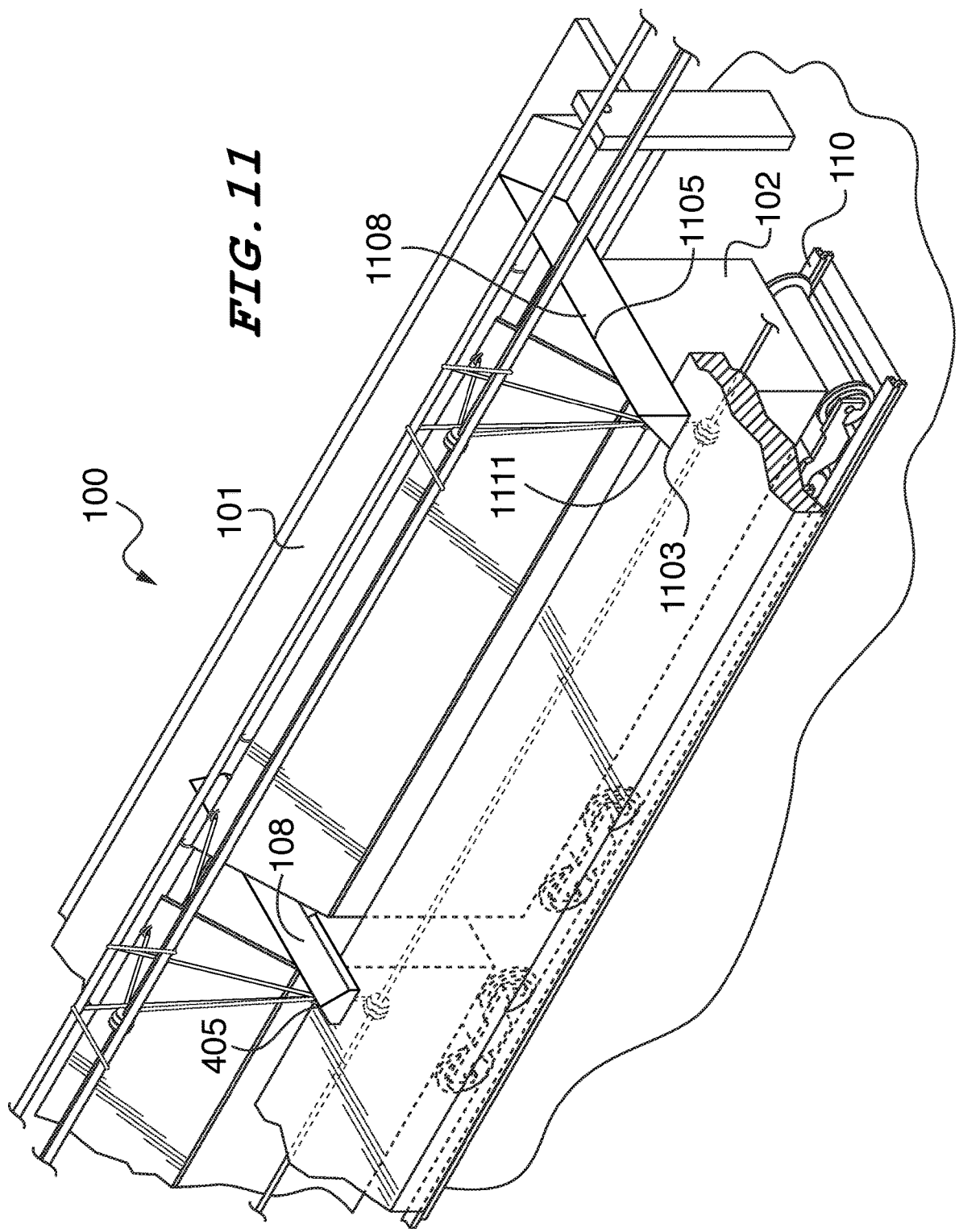
FIG. 11 is a partial top, front and side perspective view of one end of middle and lower tiers of a railway loading system comprising a hinged and pronged plate in a lowered position above the end of a string of gondola cars on a track, according to an embodiment.

FIG. 11 is a top, front and side perspective view of a railway loading system 100 comprising a HAPP 101 in a lowered position above one or more gondola cars 102 on a track 110 wherein the HAPP 101 comprises an end prong 1108, according to an embodiment. This end prong 1108 differs from the prongs 108 described above because it comprises a sloped surface 1111 wherein the lowest part of the sloped surface 1111 is located along a first edge 1103 of the end prong 1108 and the highest part of the sloped surface 1111 is located along a second edge 1105 of the end prong 1108, according to an embodiment. The purpose of this end prong is to direct any bulk materials that contact the end prong 1108 in only one direction, which is into the gondola car 102 whereas the prongs 108, which each comprise a midline 405 can direct the bulk material in two directions.

The many features and advantages of the inventive concept are apparent from the detailed specification and, thus, it is intended by the appended claims to cover all such features and advantages of the concept that fall within its true spirit and scope. Further, since numerous modifications and changes will readily occur to those skilled in the art, it is not desired to limit the inventive concept to the exact construction and operation illustrated and described, and accordingly all suitable modifications and equivalents may be resorted to, falling within the scope of the inventive concept.

What is claimed is:

1. A railway loading system comprising:
   a fixed wall;
   a hinged and pronged plate comprising a fin having a first side, a second side, and a third side, in addition to a first end and a second end, wherein the first side and the second side connect at an approximate ninety (90) degree angle and the third side connects to the first side to the second side to form a triangular shape, and the fin is hingedly attached to the fixed wall at or near the approximate ninety (90) degree angle;
   two or more prongs, each having a first end and second end, wherein the first end of each prong is fixedly attached to the third side of the fin such that the bottom of each prong is in approximately the same plane as the second side of the fin and perpendicular to the first side;

the hinged and pronged plate is configured to be moved between an elevated position and a lowered position by rotating the hinged and pronged plate about the hinged attachment of the fin to the fixed wall at or near the perpendicular angle; and a drive cable system comprising at least one upper drive cable connecting the upper side of the second end of at least one prong to an upper drive spool, which is capable of raveling and unraveling the upper drive cable, and at least one lower drive cable, connecting the lower side of the second end of at least one prong to a lower drive spool, which capable of raveling and unraveling the lower drive cable.

2. The railway loading system as recited in claim 1, wherein the upper drive spool and the lower drive spool are driven by electric motors.

3. A railway loading system comprising:

a fixed wall;

a hinged and pronged plate comprising a fin having a first side, a second side, and a third side, in addition to a first end and a second end, wherein the first side and the second side connect at an approximate ninety (90) degree angle and the third side connects to the first side to the second side to form a triangular shape, and the fin is hingedly attached to the fixed wall at or near the approximate ninety (90) degree angle;

two or more prongs, each having a first end and second end, wherein the first end of each prong is fixedly attached to the third side of the fin such that the bottom of each prong is in approximately the same plane as the second side of the fin and perpendicular to the first side;

the hinged and pronged plate is configured to be moved between an elevated position and a lowered position by rotating the hinged and pronged plate about the hinged attachment of the fin to the fixed wall at or near the perpendicular angle; and the two or more prongs each comprise a front edge and rear edge and a midline located between the front edge and rear edge, wherein the front edge, rear edge and midline are all parallel to each other and all connect the first end of each of the one or more prongs to the second end of each of the one or more prongs wherein a first sloped surface of the prongs connects the midline to the front edge and a second sloped surface connects the midline to the rear edge, and wherein a higher side of the first sloped surface is located along the midline and a lower side of the first sloped surface is located along the front edge, and wherein a higher side of the second sloped surface is located along the midline and a lower side of the second sloped surface is located along the rear edge and wherein a first prong wing is pivotably connected to the front edge of the first sloped surface of the prong above and parallel to the front edge and a second prong wing is pivotably connected to the rear edge of the second sloped surface of a prong above and parallel to the rear edge.

4. The railway loading system as recited in claim 3, wherein the top edge of the first prong wing is configured to rotate away from midline of the prong and downwards toward the front edge of the prong.

5. A method for using a railway loading system to load bulk materials into a gondola car having a hinged lid, the method comprising:

providing a fixed wall;

providing a hinged and pronged plate comprising a fin having a first side, a second side, and a third side, in addition to a first end and a second end, wherein the first side and the second side connect at a an approximate ninety (90) degree angle and the third side connects the first side to the second side to form a triangular shape, and the fin is hingedly connected to the fixed wall at or near the approximate ninety (90) degree angle and the hinged and pronged plate is configured to be moved between an elevated position and a lowered position over the gondola car by rotating the hinged and pronged plate about the hinged connection of the fin to the fixed wall at or near the approximate ninety (90) degree angle, two or more prongs located one each just outside the two ends of the gondola car at a set distance apart from each other, each prong having a first end and second end and an upper side and a lower side, wherein the first end of each prong is fixedly attached to the third side of the fin such that the bottom of each prong is in approximately the same plane as the second side of the fin and perpendicular to the first side;

providing a drive cable system comprising at least one upper drive cable connecting the upper side of the second end of at least one prong to an upper drive spool, which is capable of raveling and unraveling the upper drive cable, and at least one lower drive cable, connecting the lower side of the second end of at least one prong to a lower drive spool, which is capable of raveling and unraveling the lower drive cable;

providing a gondola car having a hinged lid configured to move between an up position and a down position;

providing at least one coupling cable having a first end connected to the upper side of the second end of at least one prong and a second end capable of connecting to the hinged lid, wherein the coupling cable, when connected to the hinged lid is capable of lifting the hinged lid into the up position when the at least one prong is moved into the lowered position, and to lower the hinged lid into the down position when the at least one prong is moved into the elevated position;

providing bulk materials to be loaded into the gondola car;

moving the hinged and pronged plate into the elevated position by using the upper drive spool to ravel in the upper drive cable, while the lower drive spool unravels the lower drive cable;

placing the gondola car having a hinged lid into the set distance between two prongs;

connecting the first end of a coupling cable to the upper side of the second end of at least one prong and the second end of the coupling cable to the hinged lid;

moving the hinged and pronged plate into the lowered position by using the upper drive spool to unravel in the upper drive cable, while the lower drive spool is used to ravel the lower drive cable, thus causing the coupling cable to simultaneously move the 10 hinged lid into the up position; and loading the bulk material into the gondola car.

6. The method as recited in claim 5 wherein the upper drive spool and the lower drive spool are driven by electric motors.

7. The method as recited in claim 5 wherein the coupling cable comprises a first end and a second end, wherein a hook is connected to the first end of the cable.

8. The method as recited in claim 5 wherein the hook connected to the first end of the coupling cable is configured to fit through a handle disposed on the third side of the fin when the hinged and pronged plate is not in use, and through a handle disposed on a lid of a gondola car when the hinged and pronged plate is in use.

9. The method as recited in claim 5 wherein one or more prongs comprise a prong wing pivotably connected to the prong.

10. A railway loading system comprising:
a fixed wall;
a bottom tier to provide a platform for the ingress and egress of gondola cars;
a fin-side middle tier and a lid-side middle tier to provide working platforms for attendants;
a top tier to provide a platform for the ingress and egress of trucks carrying the bulk materials to be loaded onto the gondola cars;
a hinged and pronged plate comprising a fin having a first side, a second side, and a third side, in addition to a first end and a second end, wherein the first side and the second side connect at an approximate ninety (90) degree angle and the third side connects to the first side to the second side to form a triangular shape, and the fin is hingedly attached to the fixed wall at or near the approximate ninety (90) degree angle;
two or more prongs, each having a first end and second end, wherein the first end of each prong is fixedly attached to the third side of the fin such that the bottom of each prong is in approximately the same plane as the second side of the fin and perpendicular to the first side; and the hinged and pronged plate is configured to be moved between an elevated position and a lowered position by rotating the hinged and pronged plate about the hinged attachment of the fin to the fixed wall at or near the perpendicular angle.

11. The railway loading system recited in claim 10 wherein the lid-side middle tier is opposite the fixed wall and in approximately the same plane as the second side of the fin.

12. The railway loading system recited in claim 10 wherein the bottom tier is below the fin-side middle tier and the lid-side middle tier and the top tier is above the fin-side middle tier and the lid-side middle tier.

13. The railway loading system as recited in claim 10, wherein a drive cable system comprising at least one upper drive cable connecting the upper side of the second end of at least one prong to an upper drive spool, which is capable of raveling and unraveling the upper drive cable, and at least one lower drive cable, connecting the lower side of the second end of at least one prong to a lower drive spool, which is capable of raveling and unraveling the lower drive cable.

14. The railway loading system as recited in claim 10, wherein the two or more prongs each comprise a front edge and rear edge and a midline located between the front edge and rear edge, wherein the front edge, rear edge and midline are all parallel to each other and all connect the first end of each of the one or more prongs to the second end of each of the one or more prongs.

* * * * *